US008076604B2

(12) United States Patent  (10) Patent No.: US 8,076,604 B2
Rippl  (45) Date of Patent: Dec. 13, 2011

(54) PROCESS AND DEVICE FOR ELECTRIC SPOT WELDING

(75) Inventor: Peter Rippl, Augsburg (DE)

(73) Assignee: KUKA Systems GmbH, Augsburg (DE)

( * ) Notice: Subject to any disclaimer, the term of this patent is extended or adjusted under 35 U.S.C. 154(b) by 1152 days.

(21) Appl. No.: 11/813,536

(22) PCT Filed: Dec. 22, 2005

(86) PCT No.: PCT/EP2005/013946
§ 371 (c)(1),
(2), (4) Date: Jul. 9, 2007

(87) PCT Pub. No.: WO2006/074801
PCT Pub. Date: Jul. 20, 2006

(65) Prior Publication Data
US 2008/0047938 A1    Feb. 28, 2008

(30) Foreign Application Priority Data
Jan. 11, 2005   (DE) .......................... 10 2005 001 341

(51) Int. Cl.
*B23K 11/00*   (2006.01)
(52) U.S. Cl. .................... 219/91.2; 219/86.1; 219/86.25; 219/87
(58) Field of Classification Search ................. 219/86.1, 219/86.25, 86.31, 86.41, 86.51, 86.24, 86.7, 219/87, 90, 91.1, 91.2, 108, 110, 117.1; 901/41, 901/42, 125.12; 700/245, 254
See application file for complete search history.

(56) References Cited

U.S. PATENT DOCUMENTS

| 4,855,560 | A |   | 8/1989 | Sonoda et al. |
|---|---|---|---|---|
| 5,047,608 | A |   | 9/1991 | Takahashi et al. |
| 5,321,225 | A |   | 6/1994 | Boyer |
| 5,510,593 | A | * | 4/1996 | Sakai ........................ 219/86.7 |
| 5,541,382 | A |   | 7/1996 | Taylor et al. |
| 5,945,011 | A |   | 8/1999 | Takano et al. |
| 6,069,338 | A |   | 5/2000 | Sano et al. |

FOREIGN PATENT DOCUMENTS

| DE | 38 03 502 C1 | 9/1989 |
|---|---|---|
| DE | 690 11 359 T2 | 3/1995 |
| DE | 692 20 409 T2 | 11/1997 |
| DE | 197 29 968 C1 | 4/1999 |
| EP | 0 644 014 A1 | 3/1995 |
| JP | 2001 105 153 | 4/2001 |

* cited by examiner

*Primary Examiner* — Tu B Hoang
*Assistant Examiner* — Brian Jennison
(74) *Attorney, Agent, or Firm* — McGlew and Tuttle, P.C.

(57) ABSTRACT

A plurality linkages, preferably a robot holding either a spot welder with welding guns or the workpiece. The plurality of linkages move a spot welder with open tongs toward a first spot weld position. The welding guns are then closed on the workpiece and welding is performed at the first spot weld position. While the welding is being performed, parts of the plurality of linkages are advanced toward a second weld position while the welding guns remained closed at the first spot weld position. When the welding at the first position is finished, parts of the linkages are already advanced towards the second position, and the remaining linkages are then advanced to the second position. This allows the linkages or robot to move faster from one spot weld position to another.

11 Claims, 5 Drawing Sheets

PROCESS AND DEVICE FOR ELECTRIC SPOT WELDING

CROSS REFERENCE TO RELATED APPLICATIONS

This application is a United States National Phase application of International Application PCT/EP2005/013946 and claims the benefit of priority under 35 U.S.C. §119 of DE 10 2005 001 341 filed, 11 Jan. 2005 the entire contents of which are incorporated herein by reference.

FIELD OF THE INVENTION

The present invention pertains to a process and a device for the electric spot welding of a plurality of welding spots made along a path of a workpiece by means of welding guns with electrodes. The workpiece and the welding guns are moved by a displacing motion between the welding spots by one or more multiaxial robots, especially articulated arm robots.

BACKGROUND OF THE INVENTION

Such a spot welding technique with electric spot welding guns, e.g., C tongs or X tongs, is known from practice. A plurality of welding spots are made with this welding technique one after another along a path on the workpiece, especially a vehicle body part. The workpiece and the welding guns are moved relative to one another by one or more multiaxial robots, especially in the form of six-axis articulated arm robots. In one variant, the robot guides the welding guns in relation to the stationary workpiece. In the second variant, the robot moves the workpiece in relation to the stationary welding guns. In a third variant, both the welding guns and the workpiece can be moved relative to one another by a robot each. A displacing motion is performed during this relative motion between the workpiece and the welding guns along the path to approach the individual welding positions. In the state of the art, the workpiece and the welding guns are positioned relative to one another at the weld joint, and an inoperative position without further displacing motion is then assumed. When the welding guns are closed and during the welding process, the relative positions of the welding guns and the workpiece are preserved. The robot or robots holding the welding guns and/or the workpiece stop while the welding is performed. After the welding is finished, then the robot or robots relatively move the workpiece and welding guns to the next position. This process is then repeated for each new welding position.

SUMMARY OF THE INVENTION

The object of the present invention is to show a better technique for electric spot welding.

In particular, this object is accomplished by a plurality linkages, preferably a robot holding either a spot welder with welding guns or the workpiece. The plurality of linkages move a spot welder with open tongs toward a first spot weld position. The welding guns are then closed on the workpiece and welding is performed at the first spot weld position. While the welding is being performed, parts of the plurality of linkages are advanced toward a second weld position while the welding guns remained closed at the first spot weld position. When the welding at the first position is finished, parts of the linkages are already advanced towards the second position, and the remaining linkages are then advanced to the second position. This allows the linkages or robot to get a head start on the moving from one spot weld position to another.

Preferably, the linkages closest to the base of the robot are advanced while welding is being performed. The remaining linkages are usually lighter and smaller and can be moved to the next position much faster than the linkages closest to the base. The linkages closest to the spot welder or workpiece can also perform a counteracting or compensating movement to allow the tongs to remain at the first position while the advancing linkage advances. One particularly desirable compensating movement is to angle of the tongs with electrodes facing toward the direction of the first welding spot position. Once the electrodes are in contact with the workpiece, the tongs rotate about the welding spot position so that the other end of the tongs moves towards the second welding spot position. One of the linkages, spot welder, tongs and even the electrodes, are in relative movement with respect to the workpiece when the welding occurs according to the present invention. With regard to the electrodes, the electrodes pivot about the welding spot position when the tongs perform their angular movement.

Various effects and advantages arise from the relative motion between the workpiece and the welding guns, especially between the workpiece and electrodes when the welding spots are made. On the one hand, time is saved. The cycle times will become markedly shorter and the load of the machine is reduced at the same time. High and largely constant speeds of motion can be reached during the displacing motion with markedly reduced acceleration and deceleration phases. Wear is reduced as a result. In addition, better spot welding quality can be attained by the relative motion between the electrodes and the workpiece during the welding process.

The shorter cycle times make possible a better utilization of the welding robots. Moreover, the necessary number of robots and welding guns in one welding station or one production line comprising a plurality of stations can be reduced. The more uniform displacing motion offers kinematic advantages for the robots. The uncontrolled reverberation or vibrating of the robot at the beginning of welding, which is common in conventional processes, can be reduced. From the viewpoint of the welding technique, the service life of the electrode caps will be longer and the above-mentioned improvement in spot welding quality is achieved. These advantages are felt especially during the welding of zinc-coated sheet metals, because the alloying with zinc on the electrode cap shows a better behavior than the uncontrolled sporadic chipping off of the foreign layer from the cap surface, as this happens in the state of the art. This alloying is an even greater problem in the state of the art in the case of the resistance spot welding of aluminum and reduces the number of welding spots that can be made with one set of electrodes.

The number of welding spots and the stability of the electrode caps can be increased with the welding technique according to the present invention. This offers marked improvements and expanded possibilities of use for the process especially when welding aluminum. The reduced amount of finishing operations needed on the workpieces is also favorable in this connection.

The relative rotation of the electrodes pressed on in relation to the workpiece has, moreover, technological advantages. The reproducibility of the electric welding parameters is improved by the rotation. This leads to the welding results becoming more uniform and to an improvement of quality. Stepping, which has hitherto been common, i.e., the stepwise adaptation of the welding voltage or of the welding current to compensate variations in the welding parameters when the active surface of the electrode increases due to the operation, can be reduced or eliminated.

The rotation of the electrodes at the welding spot diminishes or prevents the hitherto common alloying of workpiece materials on the electrodes as well as the change associated therewith in the process conditions. In addition, these alloyings may chip off in an uncontrolled manner at some time or another in case of conventional resistance spot welding, which may lead to a further and abrupt change in the process conditions. Due to the rotation of the electrodes at the contact and weld joint, these adverse effects are reduced or eliminated.

There is wear of the electrode cap in conventional resistance spot welding, and the contact and active surfaces of the electrodes become flatter and form sharper edges. Due to the enlargement of the area, this leads to a reduction of the current density, which is counteracted by corresponding stepping of the welding current or the welding voltage. These problems are solved by rotating the electrodes at the contact and weld joint. The edge formation is avoided, and the electrodes rather become round, which is favorable for the process. In addition, the current density remains constant for a longer time in the welding technique according to the present invention and does not change in an uncontrollable manner over the service life. On the contrary, it is found that the current density is a function of the angle of rotation of the electrode at the weld joint. Depending on the angle of rotation, the current density may even increase. This in turn offers the possibility of influencing the current density by varying the electrode rotation and the angle of rotation and of setting it at a favorable value. The rotary motion may be optionally intermittent, possibly reversing. Technological advantages would be in the foreground in such a case at the expense of the saving in terms of cycle time.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, the present invention pertains to a process for the electric spot welding of workpieces 2 as well as to a correspondingly controlled welding means 1 used herefor, which contains a correspondingly suitable control 4 and a control program.

Figure 1:
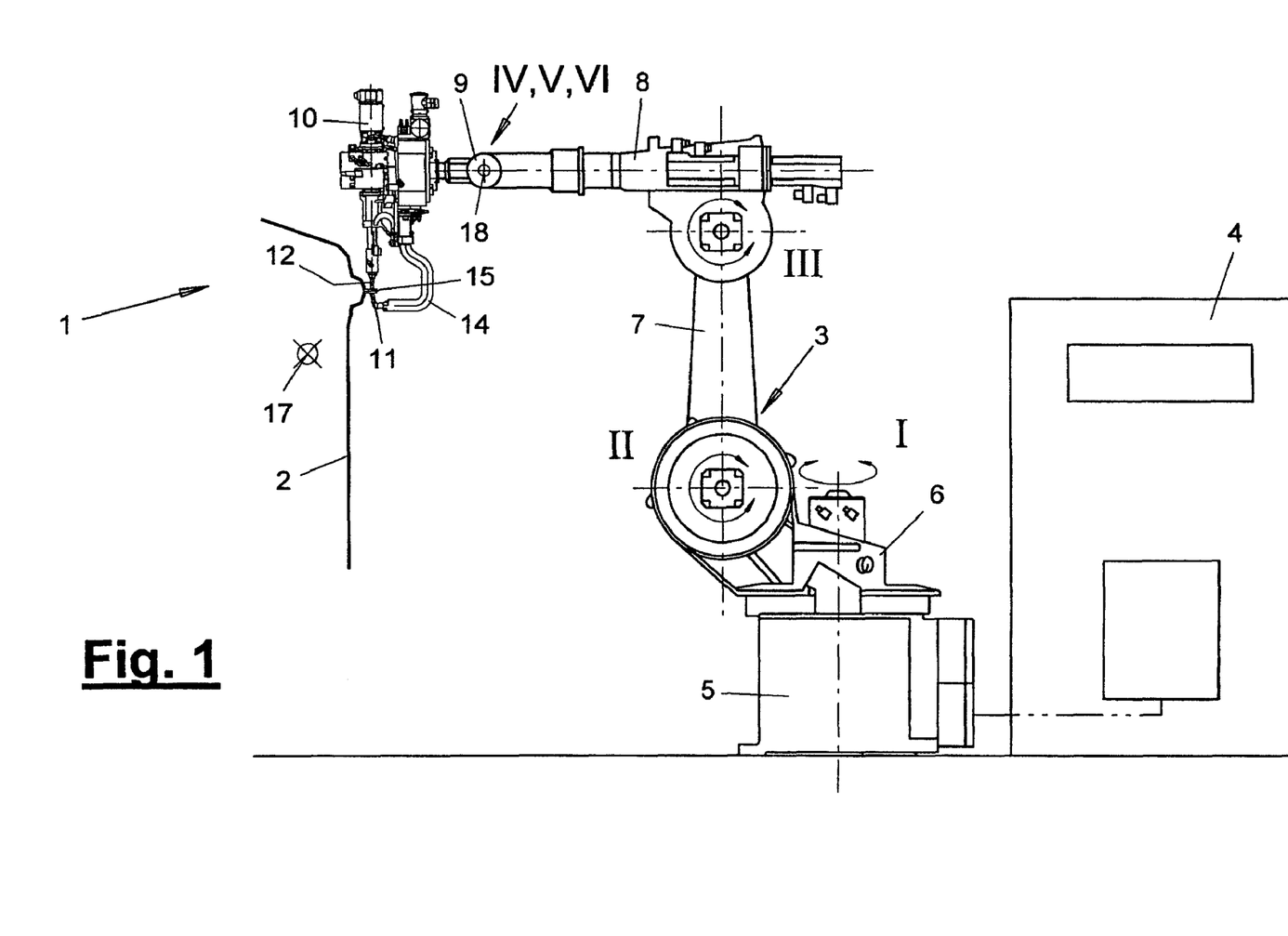
FIG. 1 is a schematic side view of a welding means with robots, spot welding guns and a workpiece.

FIG. 1 shows the side view of a schematic embodiment of such a welding means 1. The welding means 1 comprises welding guns 10 for electric spot welding and a robot 3 with a control 4, which robot guides the welding guns 10 in the exemplary embodiment being shown relative to a workpiece 2 shown in a cutaway view. A plurality of welding spots 15 are made here with the welding guns 10 along a path 16 on the workpiece 2. The welding guns 10 are moved by the robot 3 from welding spot 15 to welding spot 15 in a displacing motion.

The workpiece 2 may be of any type, size and design. The workpiece is preferably a component of vehicle body shells. For example, two components are connected to one another at a projecting flange by means of welding spots 15. The path 16 or sequence of welding spots 15 to be made on the workpiece 2 is determined by the geometry of the component. The path 16 may have a straight and flat course in the simplest form, as in FIGS. 2 and 3. On the other hand, it may have any other desired share and, e.g., the curved shape shown in FIG. 4. FIG. 4 illustrates, for example, a component opening located on the inside, e.g., a door opening of a body, on the peripheral edge of which the welding spots 15 are to be made.

The so-called making of a welding spot is defined as the operation or functional procedure starting from the beginning of the closing of the tong arms 14 of the welding guns 10 with the subsequent press-on and welding phase until the conclusion of the opening of the welding guns 10.

The robot 3 may be of any desired and suitable design. It is preferably a multiaxial industrial robot, especially an articulated arm robot with at least six rotatory axes. The robot 3 may optionally have auxiliary axes, especially one or more additional travel axes. In the preferred embodiment, the robot 3 has a frame 5, on which a carrousel 6 is mounted rotatably about a first upright main axis or robot axis I. A rocker 7 is mounted pivotably about a second main axis or robot axis II on the carrousel 6. The axis II preferably extends horizontally and at right angles to the axis I. An extension arm 8 is mounted pivotably about a likewise horizontal third robot axis or main axis III at the other end of the rocker 7. A robot hand 9, which in turn has a plurality of motion axes or hand axes, is located at the front end of the extension arm 8. In the preferred embodiment, the robot hand is a three-axis robot hand 9 with three orthogonal hand axes IV, V and VI, which intersect at the hand root point. Thus, the robot 3 being shown has, on the whole, six rotatory axes I through VI.

The welding guns 10 are mounted on the driven flange of the robot hand 9, which flange is rotatable about the hand axis VI. The welding guns 10 are, e.g., electric spot welding guns, which have two or more electrodes 11, 12 and two or more tong arms 14. FIG. 1 shows welding guns 10 of a C-shaped design with a stationary electrode 11 and a corresponding fixed tong arm 14. The welding guns also have a mobile electrode 12, which can be fed linearly, with the tong arm thereof. To weld a welding spot 15, the electrodes 11, 12 are moved towards the workpiece 2 and pressed onto the workpiece surface on both/opposite sides. An electric welding current is passed through the workpiece. This leads to a local heating and plasticization of the workpiece surfaces that are in contact with the electrodes, as well as to the formation of a welding spot 15 with a so-called welding spot at the contact site of the workpiece parts.

The robot 3 is equipped with a robot control 4, which contains a computer-aided computing unit with data and program memories and a control program for controlling the robot 3 and the welding guns 10. The axes I through VI of the robot 3 are controlled according to a stored motion program. A process control for the welding process, with which the welding guns 10 and a welding power source, not shown, are controlled, may also be integrated in the robot control 4. As an alternative, the process control may also be arranged externally and coupled with the robot control 4. The path 16 to be followed and the positions of the individual welding spots 15 are stored in the robot control 4. The welding parameters and tong control parameters necessary at each welding spot 15 are stored in the welding control. The needed process parameters may optionally also be determined and set at the site in response to the local properties of the workpiece, which are measured in a suitable manner, on the basis of a technology data bank. The control program couples the motions of the robot and the welding process in the manner described below.

Figure 5:
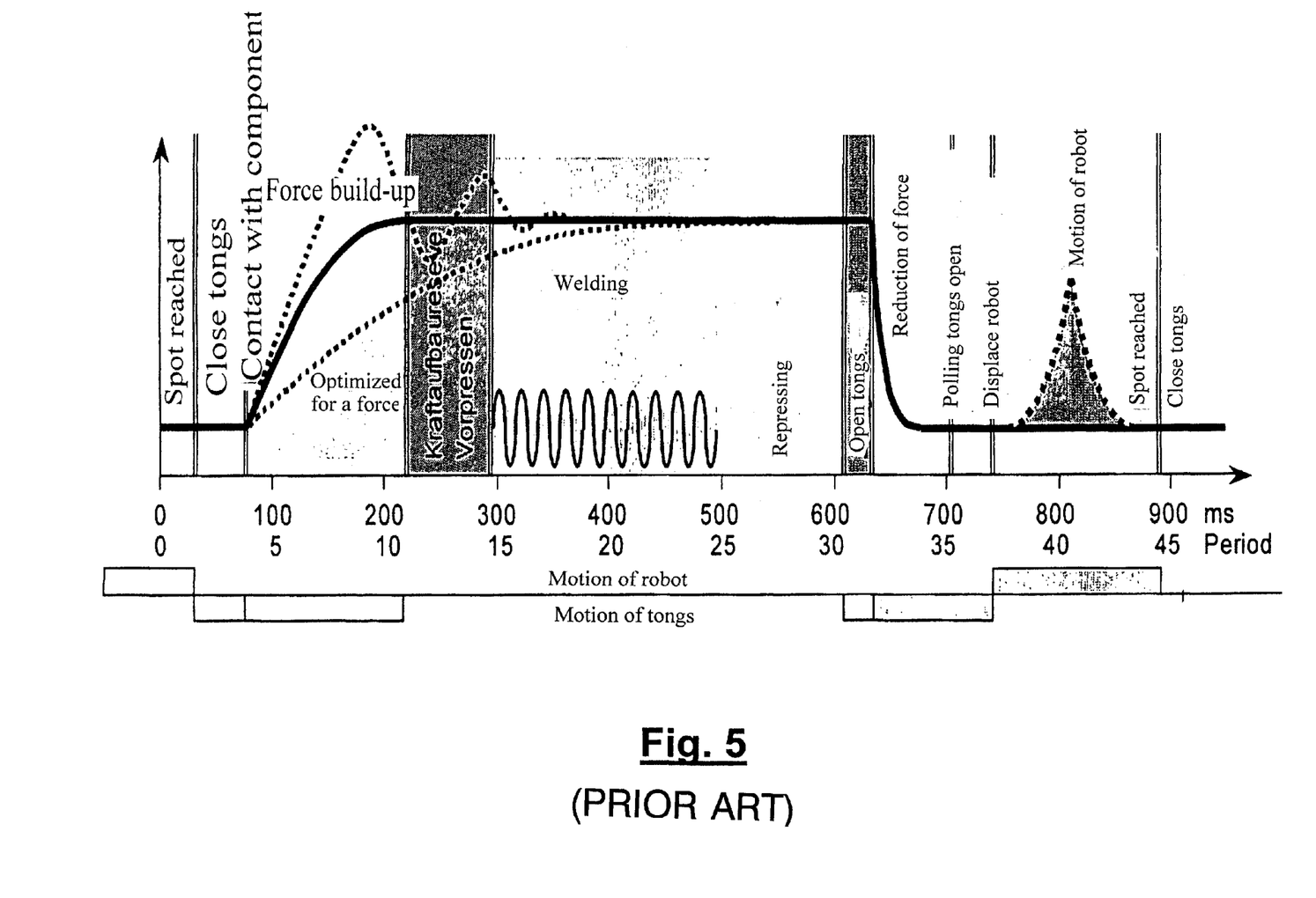
FIG. 5 is a diagram of forces and motion of a welding guns during the making of a welding spot in the conventional manner.

FIG. 5 illustrates in a diagram the motion and functional process of conventional welding guns 10 according to the state of the art, the functions and the tong or electrode force being plotted over time. In the state of the art, the welding guns 10 are first moved by the robot 3 by a displacing motion to the intended weld joint or the spot to be joined and are positioned there, As soon as the joining point is reached, the robot 3 stops and does not move the welding guns 10 any farther relative to the workpiece 2. After reaching the joining point, the command to close the tongs is sent according to the diagram. For example, the mobile electrode 12 is now moved towards the stationary electrode 11 and the tong arm 14. When the electrode 12 being moved touches the workpiece 2, the stationary electrode 11 is moved towards the workpiece 2 under the action of the tong drive with the tong compensation being optionally cleared. After the two electrodes 11, 12 have come into contact with the workpiece 2, the force is built up between the electrodes pressed on by the tong drive on both sides. Force peaks are avoided by settable throttles in the case of pneumatic tong drives, but they prevent the fastest build-up possible of the force for the cycle time. Subsequent to this closing motion runs the rate time with the so-called repressing of the workpiece parts and the force build-up reserve. If different forces are preselected, there may be different force build-up times, which are equalized by this time reserve in order not to weld in the range of variable and excessively weak electrode forces.

The welding process takes place thereafter, and it is followed by a repressing, within which the welding spot 15 is transformed from the pasty state into the solid phase. The opening of the tongs is started in the next phase, which likewise takes a certain time and then leads to the force build-up proper and to the lifting off of the electrodes 11, 12 from the workpiece 2. At a later point in time, a signal is sent by the welding guns 10 to indicate the fact that the tongs have indeed been opened. The next robot displacement motion and the approach to the next welding spot is subsequently started. The robot 3 accelerates the axes I through VI participating in the displacing motion from the standstill, and different axes may become leading axes depending on the state of the unit. Considerable accelerations occur in the process. Depending on the distance between the welding spots 15, the deceleration operation takes place sooner or later at the next joining point.

Depending on the distance between the spots, the robot 3 often does not reach its maximum velocity of displacement. The above-described operation takes place anew at the next joining point. In this prior-art welding technique, the robot 3 continuously moves the large mass of the welding guns 10 between maximum acceleration during the displacing motion and standstill for the welding operation. In case of a comparatively short welding time of, e.g., 0.2 sec, the calculated and actually needed time for the displacing motion is usually several times longer than the pure welding time and may be, e.g., approx. 2 sec. These long displacement times or so-called spot-to-spot times increase the cycle time in the state of the art and make it necessary, on the one hand, to utilize the full acceleration and force reserves of the robot 3. This higher load on the robot may lead to "vibrating" of the robot 3 at standing and during the closing of the welding guns 10. The welding spot 15 may not be reached exactly under the circumstances.

In the process according to the present invention, the workpiece 2 and the welding guns 10 are moved relative to one another along the path 16 when making the welding spots 15. This means that a relative motion and a guiding motion take place between the workpiece 2 and the welding guns 10 in the area between the closure and repeated opening of the welding guns 10.

There are various possibilities for this relative motion during the making of the welding spots 15. In particular, the workpiece 2 and the welding guns 10 are rotated relative to one another. The welding guns 10 may optionally be moved during these relative motions, as in the embodiment being shown, relative to the non-moving workpiece 2. As an alternative, it is possible to guide the workpiece 2 with the robot 3 by means of a suitable gripper and to move it relative to the stationary welding guns 10. In a third variant, one robot 3 may hold and guide the welding guns 10 and another robot the workpiece 2 and they may optionally also move them during the making of the welding spots. The variant shown graphically with the welding guns 10 being moved by the robot 3 will be explained below. The operations and measures described correspondingly apply to the other variants as well.

Figure 2:
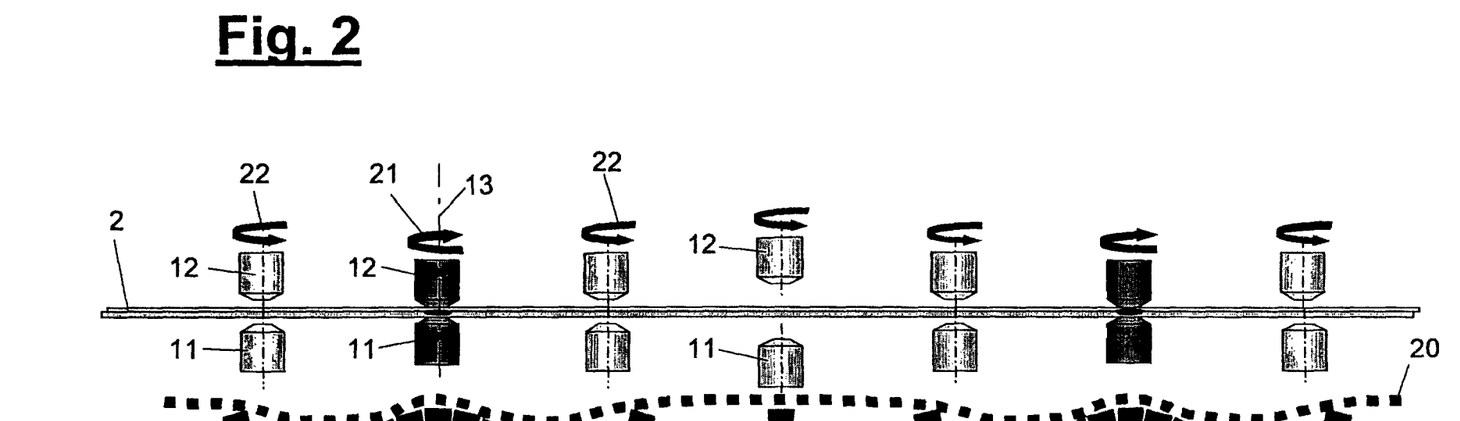
FIGS. 2 and 3 are a side view and top view, respectively, of a step by step process of electrodes and tong arms during the making of a plurality of welding spots along a straight path.
Figure 3:
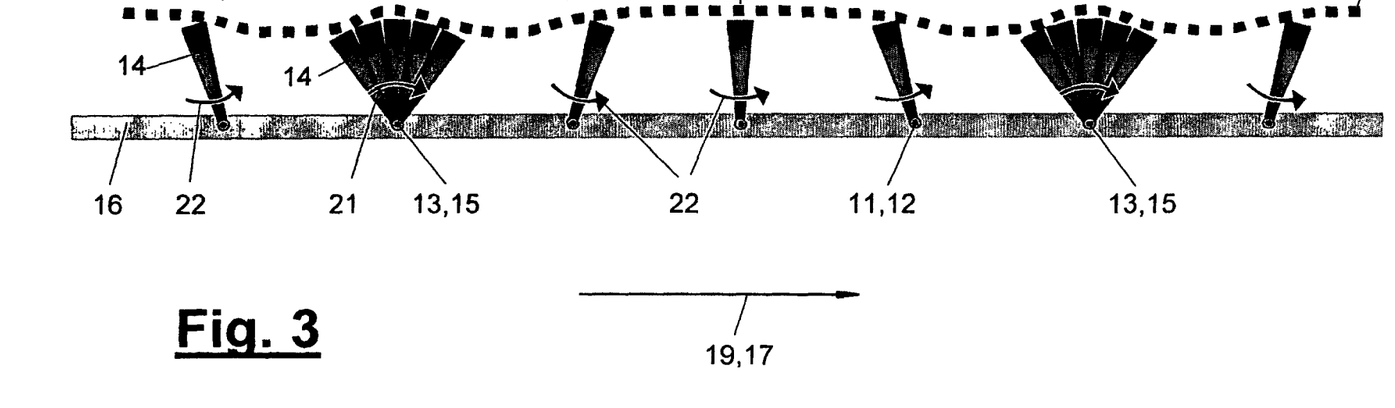
Figure 4:
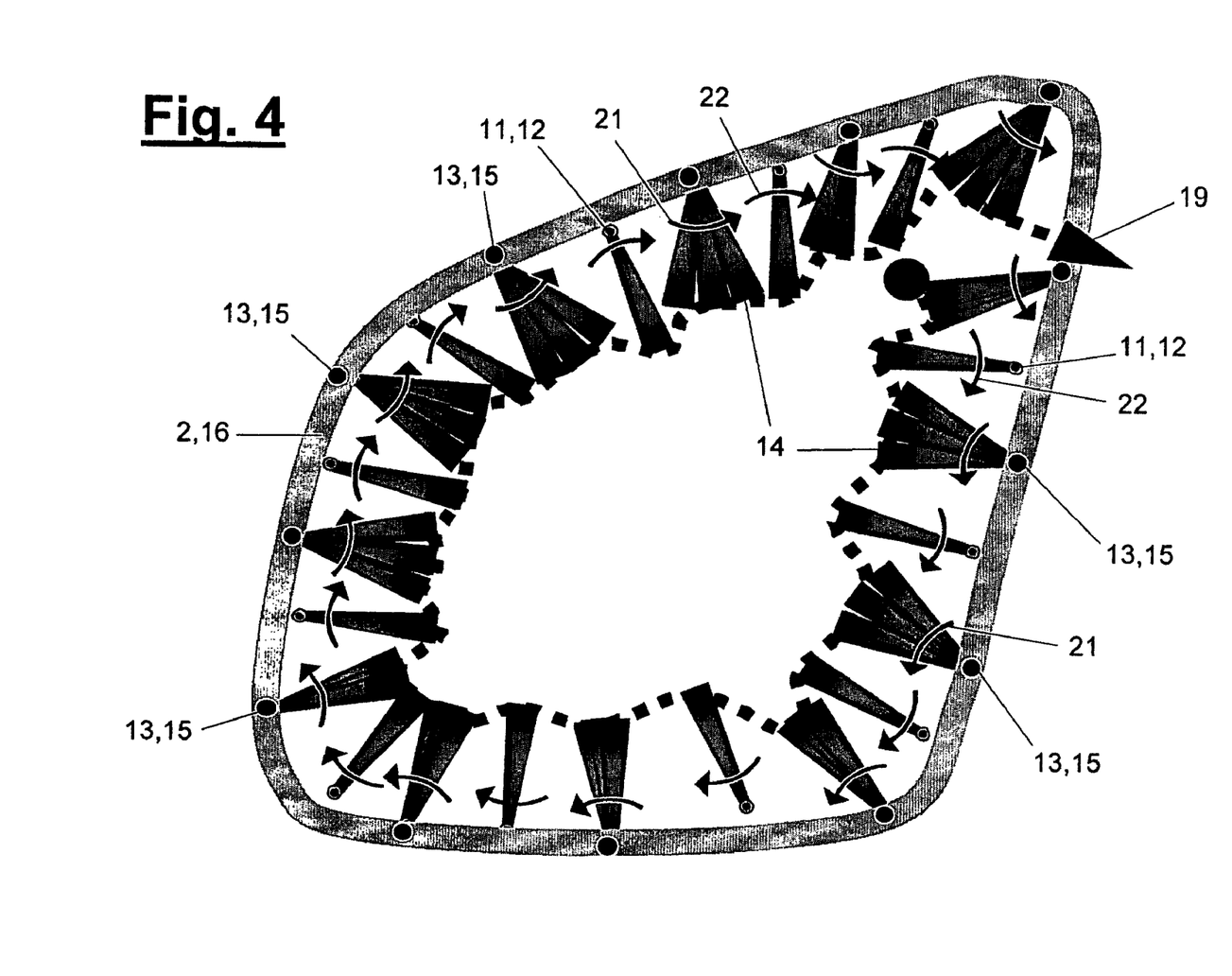
FIG. 4 is a top view of the process of electrodes and tong arms moving along a curved path.

As is illustrated in FIGS. 2 through 4, the welding guns 10 can be rotated, on the one hand, in the closed position and with pressed-on electrodes 11, 12 around the welding spot 15 relative to the workpiece 2. This rotary motion takes place, e.g., during the phases of force build-up, welding and repressing. The motion of the welding guns and the welding process are superimposed to one another.

In a preferred embodiment, the relative motion takes place during the entire phase of contact between the electrodes 11, 12 and the workpiece 2. As an alternative, the relative motion may take place during some of these phases only. The relative rotary motion about the welding spot 15 is directed in the direction 17 in which the path 16 is followed and hence in the direction of the next welding spot 15 to be approached. The tong arms 14 are also rotated during this relative rotation about the welding spot 15 and about the electrode axis 13 extending through the contact sites of the electrodes 11, 12. The axis of rotation may extend at right angles to the workpiece surface being acted on. However, it may also have, as an alternative, another angle and be directed obliquely. FIGS. 3 and 4 illustrate this by a fanned and schematic view of the tong arms 14.

In addition, the welding guns 10 may be rotated relative to the workpiece 2 during the opening of the tong arms 14. This relative motion takes place around the hand root point 18 of the robot hand 9 and is likewise directed towards the next welding spot 15 to be approached. The axis of this rotary motion is preferably directed essentially at right angles to the path 16 and to the guiding motion 20 of the robot 3.

The rotary motion also takes place when a welding spot 15 is approached and during the closure of the welding guns 10 and the tong arms 14 thereof. The welding guns 10 and its tong arms 14 are directed obliquely forward during this approach in the following direction 17. The electrodes are in front of the robot hand 9 as a result in the following direction 17. Thus, superimposed displacing motions and relative travel motions are already taking place between the welding guns 10 and the workpiece 2 during the opening and closing motions of the welding guns 10.

In a modified embodiment, only the relative rotary motions of the welding guns 10 mentioned in the introduction in relation to the workpiece 2 around the welding spot 15 can take place in case of contact of the electrodes, the opening and/or closing of the welding guns 10 being carried out, as in the state of the art, in a relative inoperative position between the welding guns 10 and the workpiece 2. In another variant, the described relative motions between the workpiece 2 and the welding guns 10 can take place only during the closing and/or opening of the welding guns 10, the welding guns 10 and the workpiece 2 assuming a relative inoperative position during the phase during which the electrodes are in contact with the workpiece 2.

To achieve the relative motions described, the robot 3 with the robot hand 9, especially with the hand root point 18, is moved, via its first main axes I through III, along the path 16 by an essentially constant guiding motion 20, and the robot hand 9 with one or more of its hand axes IV through VI performs a superimposed compensating motion 21, 22. The superimposition of motions has the advantage that the robot 3 has the possibility of not stopping or of stopping only relatively a little, so that high robot loads due to continuous deceleration and acceleration can be avoided.

During the guiding motion 20, the hand root point 18 is guided in a corresponding arc around the welding spot 15 in the course of a rotation of the welding guns 10 around the welding spot 15. The guiding motion 20 is therefore not linear. The guiding motion 20 may otherwise be directed in parallel to the path 16. This is not compulsory. Deviation from parallelism is permissible, especially depending on interfering edges or other conditions of the workpiece.

Corresponding to the above-described possibilities of embodiment, the compensating motion of the robot hand 9 with the welding guns 10 closed is a pivoting adjusting motion 21 with orientation about the welding spot 15. The welding guns 10, which are at first positioned and directed obliquely in the travel direction 17 at the workpiece 2 and at the welding spot 15, are rotated into the closing position around the welding spot 15 or the electrode axis 13 by the further motion of the robot and by the guiding motion 20 directed essentially along the path 16. The changes in orientation arising in the course of the rotation are compensated by the adjusting motion 21 of the robot hand 9 and optionally by a certain evading motion of the other robot axes 1, 2, 3.

The compensating motion of the robot hand 9 during the opening and closing operation of the welding guns 10 is an orienting motion 22, during which the kinematics is reversed and the welding guns 10 are rotated relative to the workpiece 2 and oriented relative to the next welding spot 15. This orienting motion 22 takes place relatively fast and especially faster than the guiding motion 20 of the robot 3. At the end of the phase during which the electrodes are in contact with the workpiece 2 and at the end of the rotary motion around the welding spot 15, the robot hand 9 has already moved past the welding spot 15, and the tong arms 14 are directed rearward and against the following direction 17. The welding guns 10 are rapidly reoriented after opening of the tong arms 14 during the rotating orienting motion 22 and brought into a leading position, in which they are directed obliquely to the next welding spot 15 when approaching that next welding spot, and the electrodes 11, 12 are also located in front of the robot hand.

Figure 6:
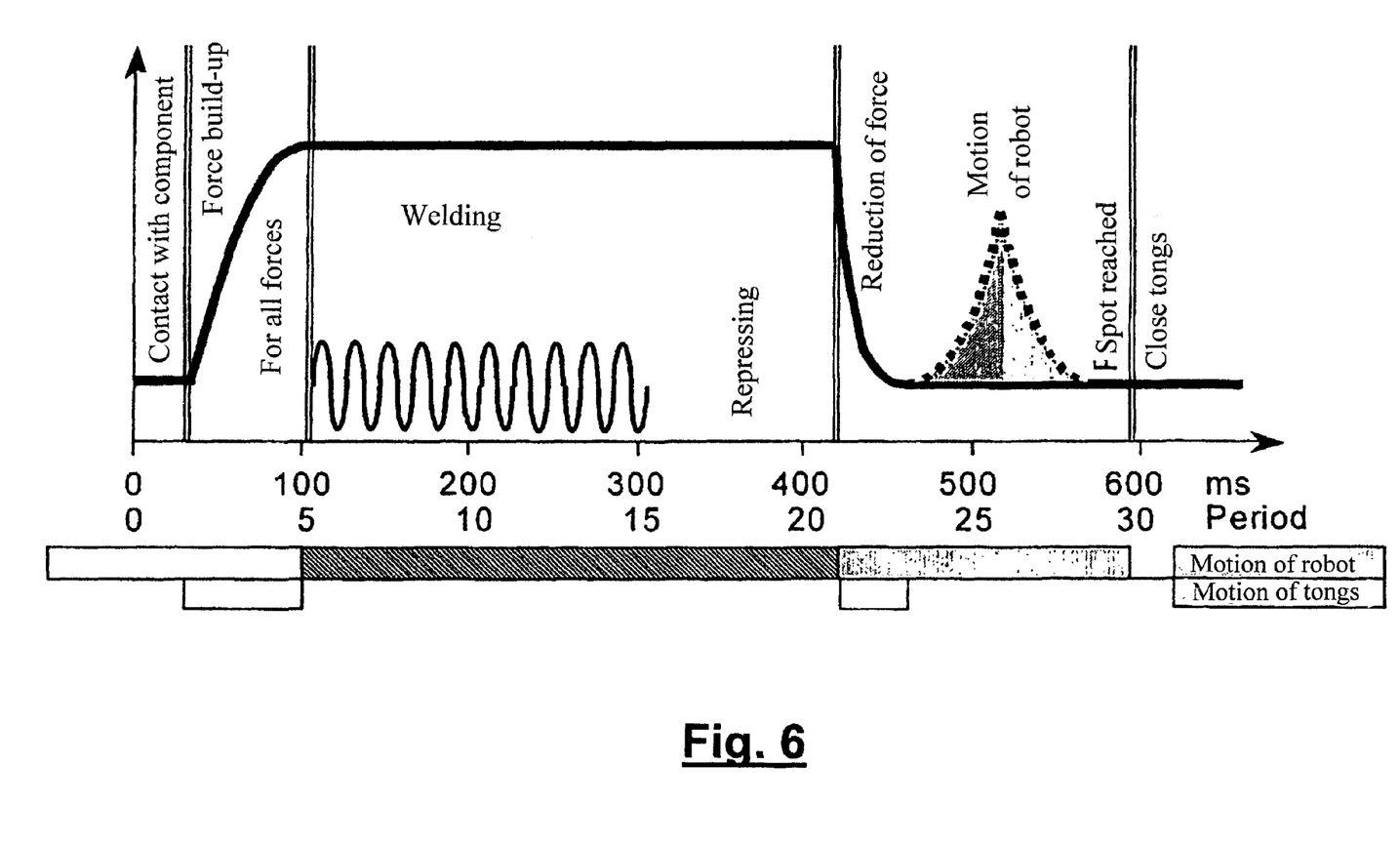
FIG. 6 is a corresponding diagram for the welding process according to the present invention.

FIG. 6 illustrates the procedure in the process according to the present invention in a diagram and compared to the diagram of FIG. 5 for the conventional technique. With the welding guns 10 directed obliquely forward during the approach to the welding spot 15, the closing motion of the electrodes 11, 12 and of the tong arms 14 thereof takes place already during the approach to the welding spot 15, so that the contact of the electrodes with the workpiece and the force build-up can take place faster. The welding phase correspondingly begins sooner than in the state of the art and can take place faster due to the relative motion between the electrodes 11, 12 and the workpiece 2. The displacing motion and the orienting motion 22 already begin during the opening of the welding guns 10. Since small changes in the orientation angle at the robot hand 9 lead to great displacing motions of the electrodes 11, 12 and of the tool center point (TCP) of the welding guns 10, the displacement times are very short. On the whole, a comparison of the diagrams in FIGS. 5 and 6 shows a marked saving of time in the process according to the present invention.

The value of the angle of rotation of the electrodes 11, 12 at the welding spot 15 and in contact with the workpiece 2 can be determined according to different criteria. If reduction of the cycle time is in the foreground, a greater angle of rotation is recommended, which is, e.g., between 1 and 45 and typically in the range of 15 and 20. The angle of rotation may depend on various criteria, e.g., the distance between the spots and the size of the tongs.

On the other hand, the rotation of the electrodes leads to advantages in terms of the reproducibility of the electric welding parameters. In particular, different current densities are obtained depending on the angle. The angle of rotation at the welding spot 15 may also depend on these process or quality criteria and be smaller than an angle of rotation that would be optimal for reducing the cycle time. A compromise is sought in this case between process optimization during welding and the cycle time. As an alternative, the angle of rotation may also depend exclusively on the process optimization.

The electrodes 11, 12 or electrode caps may be made of any desired, suitable material, e.g., the materials commonly used hitherto, such as copper, copper-chromium alloys or the like. As an alternative, they may be prepared specially in adaptation to the rotation at the weld joint, e.g., hardened or coated or consist of especially wear-resistant and heat-resistant materials, e.g., special steel, tungsten- or molybdenum-containing alloys or the like or have such a coating.

The electrodes 11, 12 may have a shape that is favorable for rotation, for example, the contact surface being rounded in a spherical shape. A favorable rounding radius may be, e.g., the radius that arises spontaneously from alloying, etc., during operation in the case of flat contact surfaces. This radius can be determined from life tests.

Various modifications of the embodiments shown are possible. This applies, on the one hand, to the design of the robot 3, which may have more or fewer axes. In addition, depending on the field of use, the robot 3 may have a different kinematics and especially one or more linear axes or even a combination of linear and rotation axes. Furthermore, the embodiment of the welding guns 10 is variable. They may be embodied, e.g., as X welding guns with tong arms 14 rotatable relative to one another. Besides, any other desired embodiments are possible.

While specific embodiments of the invention have been shown and described in detail to illustrate the application of the principles of the invention, it will be understood that the invention may be embodied otherwise without departing from such principles.

LIST OF REFERENCE NUMBERS

1 Welding means
2 Workpiece
3 Robot
4 Control
5 Frame
6 Carousel
7 Rocker
8 Extension arm
9 Robot hand
10 Welding guns
11 Electrode, stationary
12 Electrode, mobile
13 Electrode axis
14 Tong arm
15 Welding spot, contact point
16 Path
17 Following direction
18 Hand root point
19 Displacing motion, welding guns
20 Guiding motion, robot
21 Compensating motion, adjusting motion, robot hand
22 Compensating motion, orienting motion, robot hand
I, II, III Robot axes
IV, V, VI Hand axes

The invention claimed is:

1. A process for the electric spot welding a workpiece, the process comprising the steps of:
providing welding tongs with electrodes, the welding tongs including electrodes pressed-on the workpiece when the welding tongs are closed;
moving the workpiece and the welding tongs relative to each other along a path between the welding spots;
performing a plurality of spot welds along the path on the workpiece by the welding tongs;
moving the workpiece and a part of the welding tongs relative to one another along the path during said performing of the spot welds, the workpiece and the welding tongs are rotated relative to one another along the path during performing of the spot welds, the workpiece and the welding tongs are rotated relative to one another about an electrode axis extending between the pressed-on electrodes when the said welding tongs are closed, the rotary motion around the welding spot is directed in a direction of the path toward a next welding spot, the workpiece and the welding tongs are rotated relative to one another during an opening of the said welding tongs, the workpiece and the welding tongs are rotated relative to one another during a closing of the welding tongs;
a robot is provided for said moving of the workpiece and the part of the welding tongs relative to one another, the robot including main axes I, II, III performing a substantially constant guiding motion along the path and a superimposing compensating motion with a multiaxial robot hand, said compensating motion of the robot hand is an adjusting motion around the welding spot when the welding tongs are closed, said compensating motion of the robot hand is an orienting motion around a hand root point in a direction to a next welding spot when the welding tongs are open.

2. A process in accordance with claim 1, wherein:
the workpiece and the welding tongs are rotated relative to one another in a rotary motion around the spot weld when the welding tongs are closed.

3. An arrangement in accordance with claim 1, wherein:
said robot is an articulated arm robot;
said welding tongs include electrodes, said electrodes being rotated in relation to the workpiece when making said welding spots.

4. A process for producing a plurality of electric spot welds on a workpiece, the process comprising the steps of:
providing a spot welder with tongs for contacting the workpiece at a plurality of spot weld positions to perform spot welding on the workpiece at the spot weld positions;
providing a plurality of linkages for moving the spot welder relative to the plurality of spot weld positions;
determining a displacing path for the plurality of linkages, the displacing path indicating a path for moving the spot welder relative to the workpiece from each of the spot weld positions to a next spot weld position;
relatively moving the spot welder with open tongs toward a first spot weld position with the plurality of linkages;
closing the tongs of the spot welder on the first spot weld position;
performing a spot weld at the first spot weld position while the tongs are closed on the first spot weld position;
advancing a first linkage of the plurality of linkages along the displacing path while the tongs are closed on the first spot weld position;
moving a second linkage of the plurality of linkages to counteract said moving of the first linkage in order to hold the tongs closed on the first spot weld position;
the plurality of linkages are part of a robotic device that includes a base and a hand, the hand being connected to one of the spot welder and the workpiece;
said moving of the spot welder with open tongs including moving the hand respect to the base;
the first linkage is closer to the base than the second linkage;
said moving of the second linkage includes changing an angular position of the tongs with respect to the workpiece while the tongs are closed on the workpiece at the first spot weld position;
said moving of the spot welder with open tongs includes moving the second linkage in an advance movement to compensate for said moving of the first linkage while the tongs are closed.

5. A process in accordance with claim 4, wherein:
said performing of said spot weld at the first spot weld position includes pressing the welding tongs against the workpiece;
said advancing of one of the plurality of linkages along the displacing path occurs during said pressing of the welding tongs against the workpiece.

6. A process in accordance with claim 4, wherein:
said performing of said plurality of spot welds includes passing a current between the welding tongs and through the workpiece;
said advancing of one of the plurality of linkages along the displacing path occurs during said passing of the current between the welding tongs and through the workpiece.

7. A process in accordance with claim 1, wherein:
said performing of said plurality of spot welds includes pressing the welding tongs against the workpiece;
said moving of the workpiece and a part of the welding tongs relative to one another along the path occurs during said pressing of the welding tongs against the workpiece.

8. A process in accordance with claim 1, wherein:

said performing of said plurality of spot welds includes passing a current between the welding tongs and through the workpiece;

said moving of the workpiece and a part of the welding tongs relative to one another along the path occurs during said passing of the current between the welding tongs and through the workpiece.

9. An arrangement in accordance with claim 1, wherein:

a control unit rotates said welding tongs about one of said welding spots to perform the relative movement when making a respective said welding spot.

10. A process for the electric spot welding a workpiece, the process comprising the steps of:

providing welding tongs with electrodes;

pressing the electrodes of the welding tongs against a welding spot of the workpiece;

turning the electrodes of the welding tongs relative to the workpiece during said pressing of the electrodes against the welding spot;

spot welding the workpiece at the welding spot by the electrodes during said pressing and turning of the electrodes against the workpiece;

opening the welding tongs to remove the electrodes from the welding spot of the workpiece;

providing a plurality of linkages for moving the welding tongs relative to the workpiece;

determining a displacing path for the plurality of linkages, the displacing path indicating a path for the plurality of linkages to move the welding tongs relative to the workpiece from the weld spot to another weld spot;

advancing a first of the plurality of linkages along the displacing path during said pressing and turning of the electrodes against the workpiece;

providing a plurality of weld spots along the displacing path;

moving the plurality of linkages along the displacing path to bring the welding tongs to the plurality of weld spots;

spot welding the workpiece at the plurality of weld spots when the plurality of linkages bring the welding tongs to the plurality of weld spots;

said advancing of the first of the plurality of linkages includes moving the one linkage along the displacing path during said spot welding of the plurality of weld spots, said advancing of the first of the plurality of linkages includes continuously moving the first linkage along the displacing path during said spot welding of the plurality of weld spots.

11. A process in accordance with claim 10, further comprising:

moving a second of the plurality of linkages in a compensating motion to counteract said advancing of the first linkage in order to keep the electrodes in contact with the workpiece during said spot welding.

* * * * *